J. P. Worthing.
Paddle Wheel.
No 35,425.   Patented May 27, 1862.
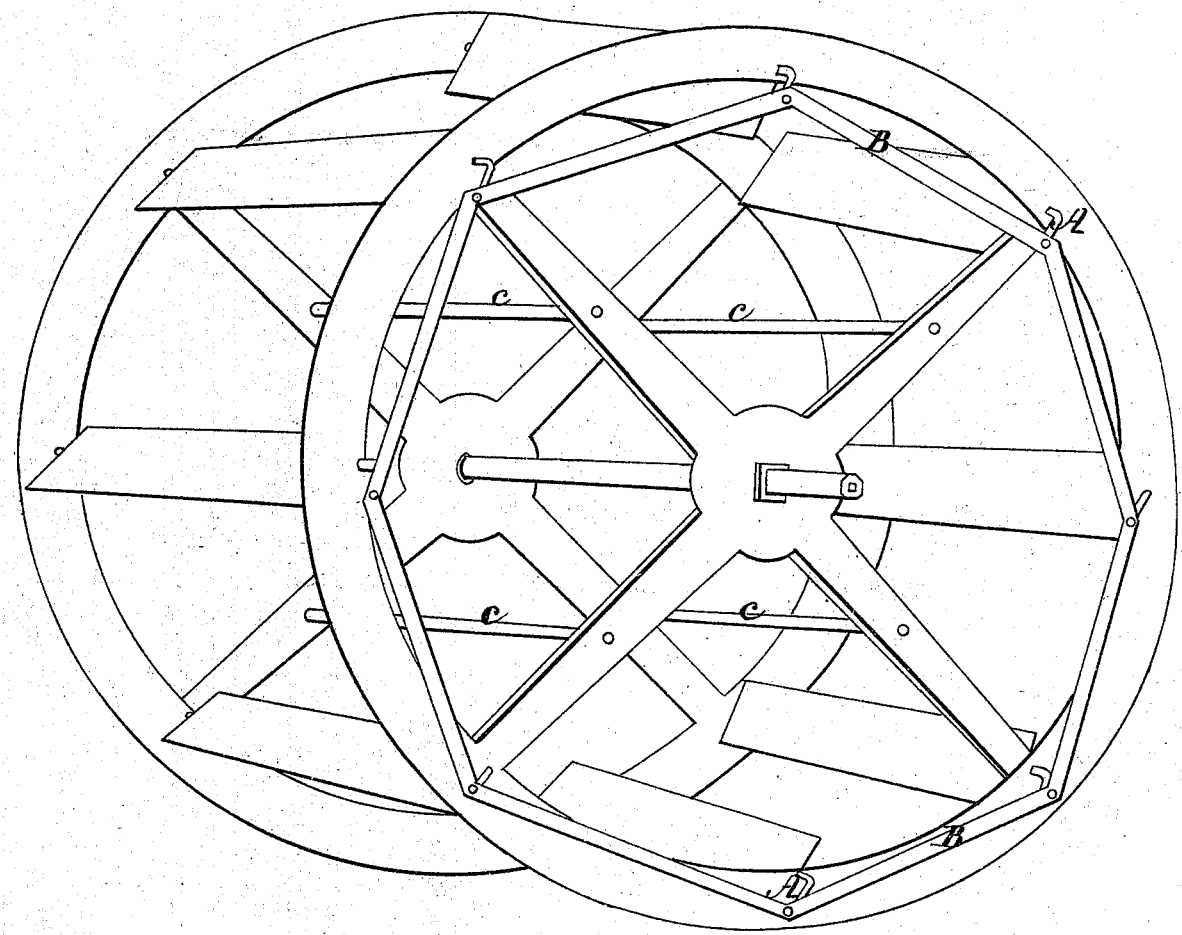

UNITED STATES PATENT OFFICE.

JOHN P. WORTHING, OF BINGHAMTON, NEW YORK, ASSIGNOR TO NELSON ORCUTT AND GEORGE W. GREGORY, OF SAME PLACE.

IMPROVED ARRANGEMENT OF FEATHERING-FLOATS WITH PADDLE-WHEELS.

Specification forming part of Letters Patent No. 35,425, dated May 27, 1862.

*To all whom it may concern:*

Be it known that I, JOHN P. WORTHING, of Binghamton, Broome county, and State of New York, have invented a new and Improved Mode of Causing Loose or Revolving Floats or Buckets of Paddle-Wheels to Enter into the Water and Come out of the Water in a Vertical Position; and I do hereby declare that the following is a full and correct description thereof, reference being had to the accompanying drawing, and to the letters of reference marked thereon.

The nature of my invention consists in attaching to the axles of the revolving or loose floats or buckets to paddle-wheels a crank, and by means of a rod or other connections attached to said cranks and extending to the cranks of other floats or paddles, so as to connect each float or bucket to other floats or buckets, by which means the float or bucket deepest in the water by the action of the water alone upon it shall compel all the other floats to enter the water and come out of the water in a vertical position, still leaving the floats or buckets wholly and entirely to the action of the water on the emerged bucket or float.

To enable others skilled in the art to make and use my improvement, I will proceed to describe its construction and operation.

I construct my floats or buckets in any of the known forms of loose floats or buckets, and attach to the axles of said floats or buckets a crank, as seen by A in the accompanying drawing, and to this crank I attach a rod or other connection to extend to the crank of the next paddle or float, as seen by B, and so on from float to float or bucket to bucket until all are connected, and for the purpose of giving strength to the wheel I make use of the several interlacing bars C C.

I am aware that feathering floats have been known prior to my invention and that various devices have been used to connect the same and keep them in a vertical position by means of links and heavy rings, which add much weight to the wheel, and are therefore objectionable, all of which devices I disclaim; but I am not aware that in any case cranks have been attached to the axles of the floats in the manner specified by me.

I claim as my invention and desire to procure by Letters Patent—

My specific method of connecting float to float or bucket to bucket when to the axles of each float I attach the crank A and the rod B, and when the whole is combined with the interlacing bars C C.

JNO. P. WORTHING.

Witnesses:
GEO. W. GREGORY,
M. SEARS.